US00RE34620E

United States Patent [19]

Camilleri

[11] E Patent Number: Re. 34,620

[45] Reissued Date of Patent:* May 31, 1994

[54] TRENCHING APPARATUS AND METHODS OF FORMING INGROUND RETAINING WALLS

[75] Inventor: Paul A. Camilleri, Gold Coast, Australia

[73] Assignee: Foundation Technology Limited, Australia

[ * ] Notice: The portion of the term of this patent subsequent to May 17, 2011 has been disclaimed.

[21] Appl. No.: 724,202

[22] Filed: Jul. 1, 1991

Related U.S. Patent Documents

Reissue of:

[64] Patent No.: 4,843,742
Issued: Jul. 4, 1989
Appl. No.: 59,745
Filed: Jun. 8, 1987

[30] Foreign Application Priority Data

Jun. 13, 1986 [AU] Australia ..... PH6409

[51] Int. Cl.[5] ..... E02F 5/08

[52] U.S. Cl. ..... 37/362; 37/357; 37/355; 405/267

[58] Field of Search ..... 37/91, 90, 87, 86, 83, 37/192 R, 192 A, 191 A, 191 R, 195, 89; 405/267, 258

[56] References Cited

U.S. PATENT DOCUMENTS

| | | | |
|---|---|---|---|
| 2,817,911 | 12/1957 | Owen et al. | 37/90 |
| 3,032,899 | 5/1962 | Brinson, Sr. | 37/90 |
| 3,425,572 | 2/1969 | Brach | 414/690 |
| 3,659,364 | 5/1972 | Wilson | 37/83 |
| 3,787,989 | 1/1974 | Heckathorn | 37/90 |
| 3,951,459 | 4/1976 | Honeycutt, Jr. | 37/87 X |
| 4,236,857 | 12/1980 | Willi | 37/87 X |

*Primary Examiner*—Dennis L. Taylor
*Assistant Examiner*—J. Russell McBee
*Attorney, Agent, or Firm*—Wood, Herron & Evans

[57] ABSTRACT

A trenching apparatus (10) is for excavating deep trenches in which inground concrete retaining or foundation walls may be formed. The trenching apparatus (10) has a crawler base (11) on which a carrier assembly (14) is pivotally supported by pivots (16) whereby it may be tilted by rams (17) to maintain the platform horizontal. An automatic control device (64) is provided for this purpose. The carrier assembly (14) has a pair of rails (18/19) along which a carriage (21) may move. The carriage (21) supports a sleeve (24) through which a trenching arm (25) may be lowered to excavate a trench section as the carriage (21) is driven along the rails (18/19).

14 Claims, 12 Drawing Sheets

TRENCHING APPARATUS AND METHODS OF FORMING INGROUND RETAINING WALLS

Matter enclosed in heavy brackets [ ] appears in the original patent but forms no part of this reissue specification; matter printed in italics indicates the additions made by reissue.

FIELD OF THE INVENTION

This invention relates to trenching apparatus and to the formation of inground retaining walls.

BACKGROUND OF THE INVENTION

In the erection of above-ground structures it is often necessary to form inground retaining walls for use as a load bearing foundation or about a site to be excavated, as a means of retaining the earth about the excavation. Where such excavations are adjacent an existing structure the retaining wall or walls along the excavation line adjacent the existing building must be formed to resist soil pressures established beneath the adjoining structure. In particular, such retaining walls must be put in place so that the soil beneath the adjoining structure will not collapse outwardly into the excavation as the latter progresses. Walls of this type may also be constructed to cut off ground water movement.

Various methods have been employed to form such walls including driving sheet piling along the excavation line to form a retaining wall, and boring a closely spaced row of holes and casting reinforced concrete piles in the respective holes to form the desired wall. If the latter process is used for retaining walls, it is necessary to add substantial horizontal strengthening to the row of piles to maintain their alignment. It is also difficult to form such walls as watertight cutoff walls. Continuous reinforced concrete walls provided excellent supporting, retaining and/or cutoff walls. However to date, it is generally not possible to form inground reinforced concrete walls economically.

Techniques for the continuous excavation of trenches of cross-section suitable for such retaining and/or cutoff walls are available. A typical machine is the subject of Australian patent application No. 41139/85. Such machines can continuously excavate a relatively deep trench along an excavation line. However, their trenching capacity is limited by flexural and machine weight considerations. Accordingly, while it may be possible to construct trenching apparatus which would excavate any desired trench, the size of the machine necessary for normal inground retaining wall trenching operations would render it impractical.

Furthermore, such trenching machines may incorporate an arm supporting an endless chain carrying cutting teeth for their trenching tools. The teeth generally project a significant distance outward from the pivots of the chain, so that cutting forces acting at a cutting tooth in a direction along the line of the chain impose bending moments which tend to flex the cutting chain in such a way as to increase the cutting depth of the cutting tooth uncontrollably, resulting in excessive loading on the cutting tooth, the chain and the trenching machine. The problem could be alleviated by using a chain of much longer pitch, but this approach would require the use iof correspondingly larger chain sprockets.

Such trenching arms must be forced forward in the excavation by advancing the machine to which the cutting arm is attached. As the depth of excavation becomes greater, this technique places large bending moments on the cutting arm and its support structure, due to the increasing vertical offset between the centroid of the normal forces on the cutting teeth and the line of action of the advance force at ground level. This problem can be alleviated by using an advance system placed within the trenching arm below ground level to force the trenching arm forward by engaging plates with the sides of the excavation and forcing the trenching arm forward by pushing the plates rearward relative to the arm.

SUMMARY OF THE INVENTION

It is an object of the present invention to alleviate the above and other disadvantages and to provide improved trenching apparatus and methods of forming inground retaining walls which will be reliable and efficient in operation. Other objects and advantages of this invention will hereinafter become apparent.

With the foregoing and other objects in view, this invention in one aspect resides broadly in trenching apparatus including a supporting base capable of being moved in a longitudinal direction along an excavation line; a mounting device on the supporting base for mounting a carriage thereon which is restrained by said mounting device for longitudinal movement relative to the supporting base, and the carriage supporting a trenching arm assembly operable, as the carriage moves relative to the supporting base, to excavate a section of trench along an excavation line.

In a further aspect, this invention resides broadly in trenching apparatus including a supporting base capable of being moved in a longitudinal direction along an excavation line; a mounting device on the supporting base for mounting a trenching arm assembly operable to excavate a section of trench along an excavation line, the trenching arm assembly being pivotable about a longitudinal axis whereby it may be tilted relative to the supporting base.

The supporting base may include skids whereby the trenching apparatus may be moved along the excavation line or it may include wheels moveable along rails alongside the excavation line. Preferably however, the supporting base is in the form of a crawler assembly and there are provided a device for driving the crawler assembly. It is also preferred that the mounting device along which the carriage is moveable is in the form of a platform having captive rails thereon for supporting the carriage for longitudinal movement in the desired direction whereby tilting the carriage will cause a corresponding tilt in the trenching arm assembly. Of course the carriage could be slidably mounted on the mounting device if desired and a separate retaining device could be utilised to secure the carriage to the mounting device.

Preferably, the trenching arm assembly is pivotally connected to the carriage so that it may pivot about a transverse substantially horizontal axis to enable it to be rotated to a horizontal attitude for transport. If desired hydraulic rams or the like may be used to pivot the arm or it may be lifted by a crane, either separate or mounted on the trenching apparatus. Suitably, a locking device is provided to secure the arm in selected positions.

The pivotal connection between the trenching arm assembly and the carriage may also include a slide mounting whereby the vertical position of the operatively disposed trenching arm relative to the pivot assembly may be adjusted to enable the depth of cut of the trenching arm to be varied.

The carriage may be provided with a drive device for advancing it along the platform. Further an advancing device may be associated with a lower portion of the trenching arm remote from its pivotal connection to the carriage and adapted for engagement with the side walls of the trench and operable to advance the lower portion of the trenching arm along the excavation line.

It is also preferred that the trenching apparatus be provided with a shield device trailed from the trenching arm assembly and engageable with the opposed walls of the trench to prevent the latter from collapsing, the shield device providing a clear space within the trench into which reinforcement may be fed. The shield device may also support a concrete discharge device through which concrete may be discharged into the trench behind the shield device.

Preferably the trenching apparatus is constructed with an elongate trenching arm which is movable between a raised travelling position wherein the trenching arm is aligned generally horizontally alongside the supporting base to enable its movement between sites and a lowered digging position. The trenching arm may be mounted so that it may be moved downwardly into the earth to its desired excavation depth at which it may be advanced forwardly along the mounting device to form a section of a trench. Generally, the desired trench walls will be substantially vertical within preset tolerances and to this end, the trenching arm may be mounted upon a platform which may tilt and be continuously adjustable so as to retain the trenching arm vertical within the desired tolerances. Laser beams may be employed so as to control the direction of the apparatus. The support platform may be mounted over crawler tracks on adjustable rams so as to maintain the platform level and thus hold the trenching arm vertical.

With the above described apparatus it is possible to excavate a trench in a way which allows steel reinforcing to be installed and concrete to be poured into the excavated trench about the reinforcing exposed beyond a clear space provided beyond the trenching arm. Thus an inground reinforced concrete wall may be formed which can be excavated on one side to provide a permanent load bearing wall about the excavation. Typical uses for this type of machine is in high rise and low rise building, where a retaining wall is desired during the construction phase as the basement is excavated and then as a permanent load bearing wall when the building is constructed to take the loads induced by the building and surrounding ground pressures. Other applications are in bridge abutments, wharf and canal walls.

So that the trenching arm may exert a forward thrust on the material to be excavated, a suitable mechanism may be located inside the frame of the arm and engageable with the side or bottom walls of the trench to provide a forward thrust. This may consist of a hydraulic cylinder attached to a linkage mechanism connected to side plates adapted, when the hydraulic cylinder is activated, to force the side plates into the side of the walls of the trench, and subsequently produce a force to thrust the trenching arm forwardly into the soil to be excavated.

The trenching arm may be located at the top by a mechanism which allows the digger arm to be lowered into the ground and removed from the ground. This may be done by a rack and pinion mechanism. This mechanism may allow the digger arm to be lowered to any predetermined point and held there if desired. The mechanism may also be connected to a laser beam control to ensure that the trenching arm maintains a consistent excavation level. The mechanism which supports the trenching arm may also be capable of rotating with the trenching arm to allow the trenching arm to lay horizontally in order that it may be transported. In this respect a curved rack and pinion arrangement may be used. This allows the trenching arm to be withdrawn from the ground and then rotated and locked into the horizontal position for transportation. The same mechanism may also allow the trenching arm to remain vertical when in operation irrespective of the attitude of the mounting base. The mounting base may be in the form of a pneumatic-tired chassis.

The deck of the machine may be hinged around the supporting base on the side adjacent the trenching arm and the other side of the deck may be mounted on hydraulic cylinders, such that the deck of the machine may be maintained level. Adjustment of the hydraulics could be automatic. The deck of the machine may house the engine, cooling system, hydraulic system and any micro-processor equipment to control the machine, such that as far as possible it operates automatically.

In another aspect, this invention reside broadly in a method of forming a reinforced concrete retaining wall including: continuously forming a trench and simultaneously maintaining the trench walls against collapse over a section thereof behind the leading end wall of the trench with a clear space therein into which reinforcement may be inserted; inserting reinforcement into the clear space, and pumping concrete into the trench rearwardly of the clear space to fill the trench as the clear space advances along the trench being formed.

The above method may be performed by excavating the trench into bedrock so that a footing of the retaining wall is keyed therein and thereby retained in place.

BRIEF DESCRIPTION OF THE DRAWINGS

In order that this invention may be more readily understood and put into practical effect, reference will now be made to the accompanying drawings, wherein.

DESCRIPTION OF THE PREFERRED EMBODIMENTS

Figure 1:
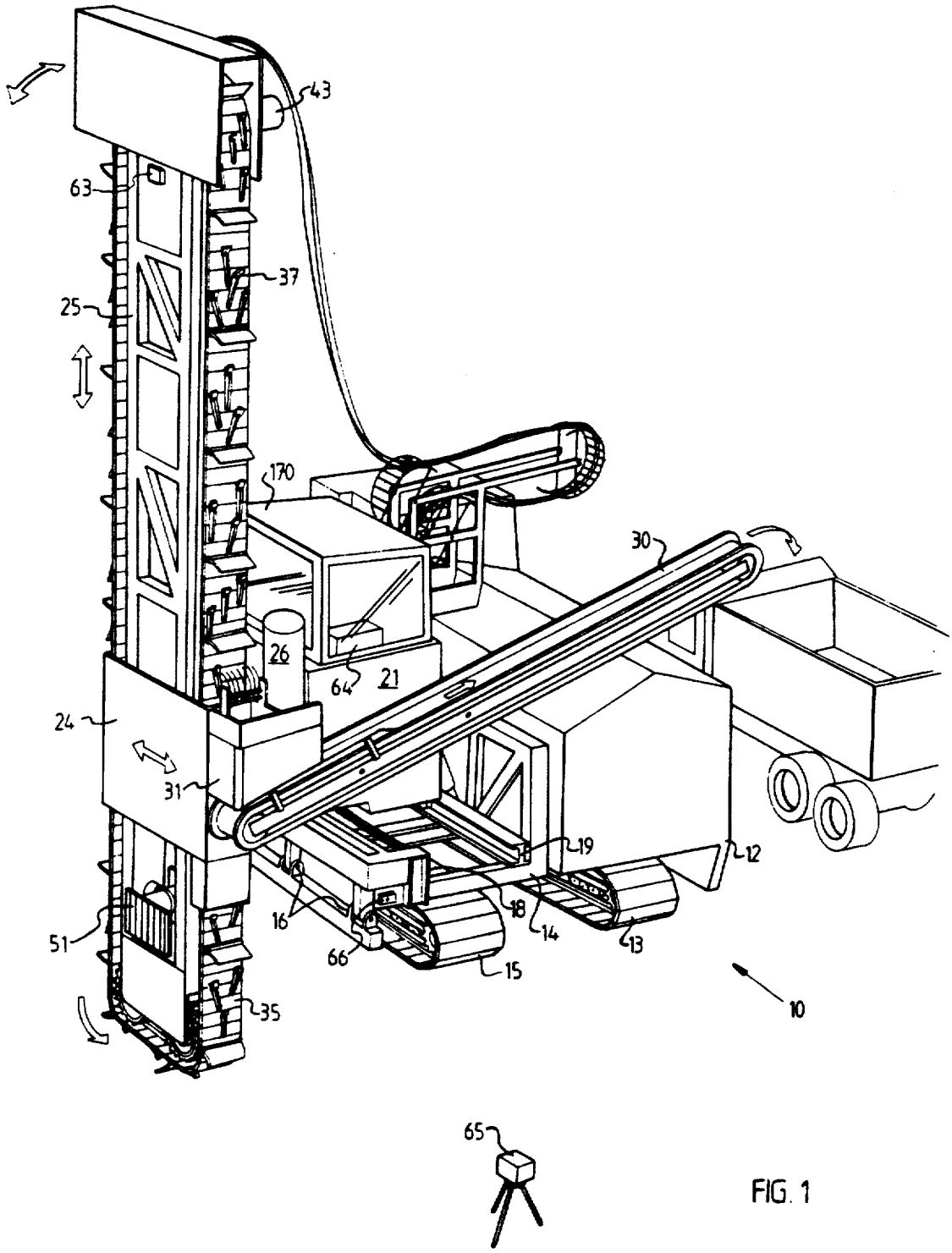
FIG. 1 is a perspective view of a preferred form of trenching apparatus.
Figure 2:
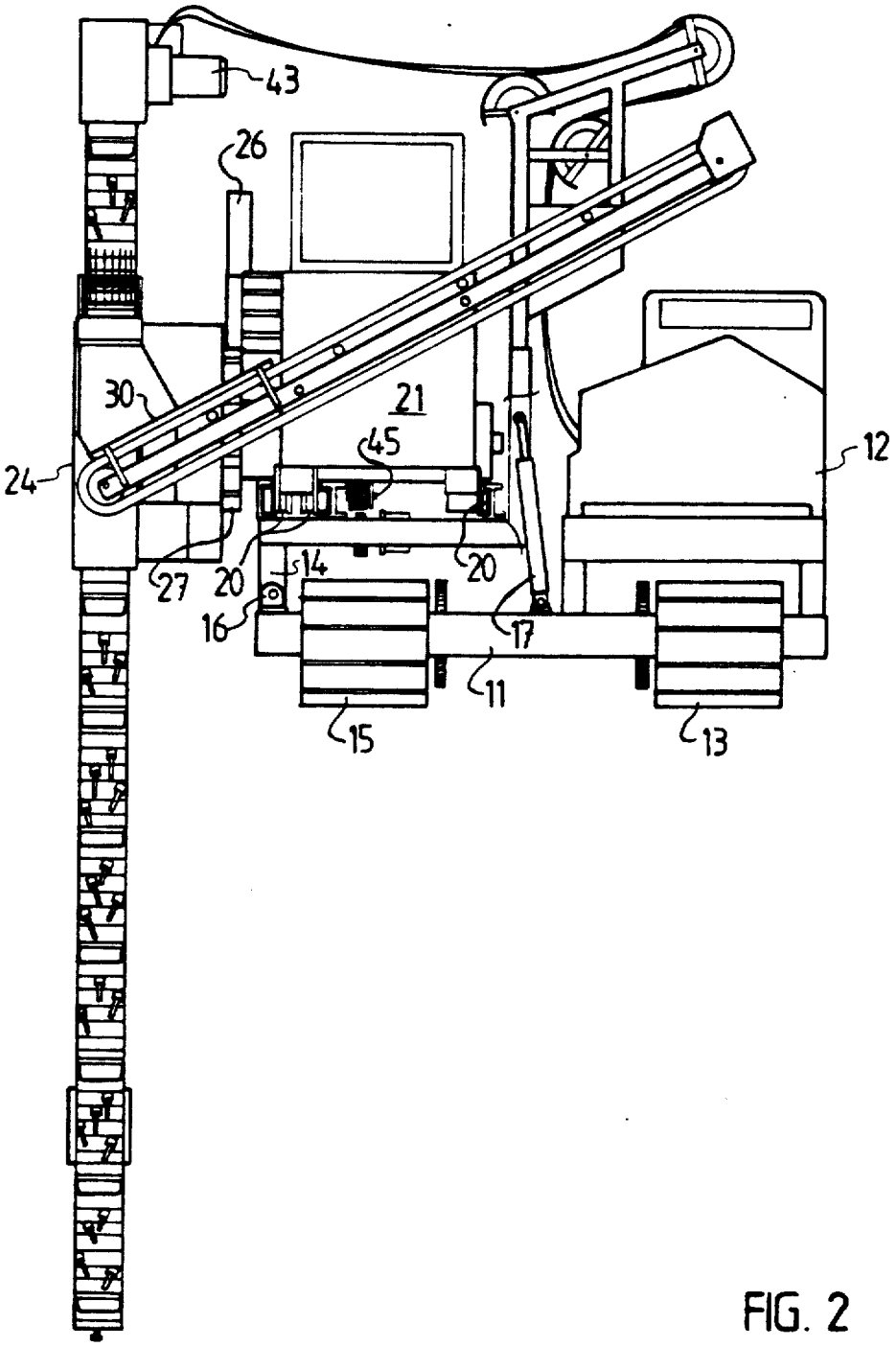
FIG. 2 is an end view of the trenching apparatus.
Figure 3:
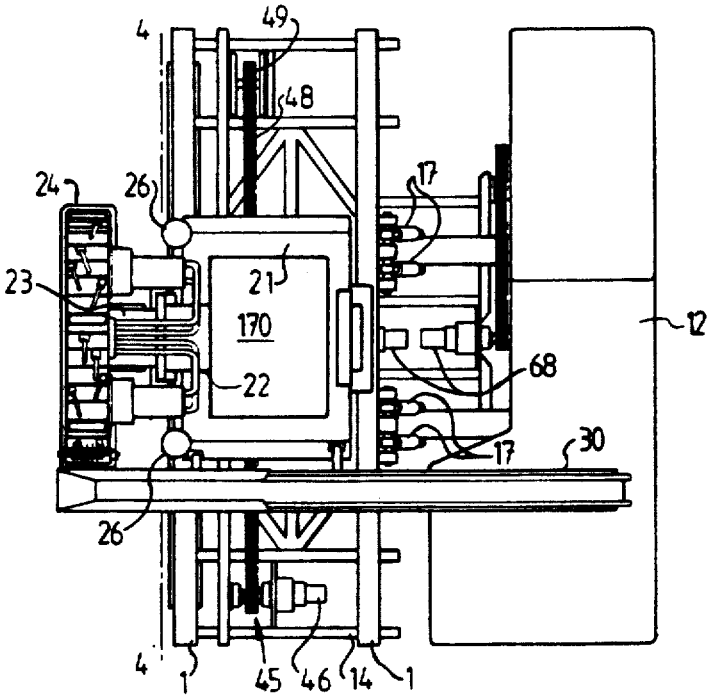
FIG. 3 is a plan view of the trenching apparatus.

The trenching apparatus 10 includes a crawler base assembly 11 which supports a power-pack 12 above one crawler track 13 for supplying power to the various hydraulic rams and motors incorporated in the apparatus, and a carrier assembly 14 above the other crawler track 15. The carrier assembly is pivotally connected at 16 to the crawler base assembly for pivotal movement about a longitudinal tilt axis outwardly of the crawler track 15 and hydraulic rams 17 are provided to selectively tilt carrier assembly 14. The latter has a pair of captive longitudinally extending rails 18 and 19 which have upper and lower rail surfaces which engage about wheels 20 mounted on a carriage 21 which is restrained by the rails 18 and 19 for longitudinal motion therealong above the crawler track 15.

The carriage 21 is provided with a central bearing assembly 22 which supports a transversely extending pivot tube 23 which extends outwardly beyond the crawler base assembly 11 and connected fixedly to a mounting sleeve assembly 24 through which the trenching arm 25 is reciprocable. The bearing assembly 22 retains the pivot tube 23 for rotation about a transverse horizontal axis and it permits limited free axial movement of the pivot tube and thus the trenching arm, so that in use the latter may veer slightly away from the desired excavation line as a result of a side force exerted by an obstruction in the excavation and thus prevent the imposition of excessive forces on the apparatus.

Figure 4:
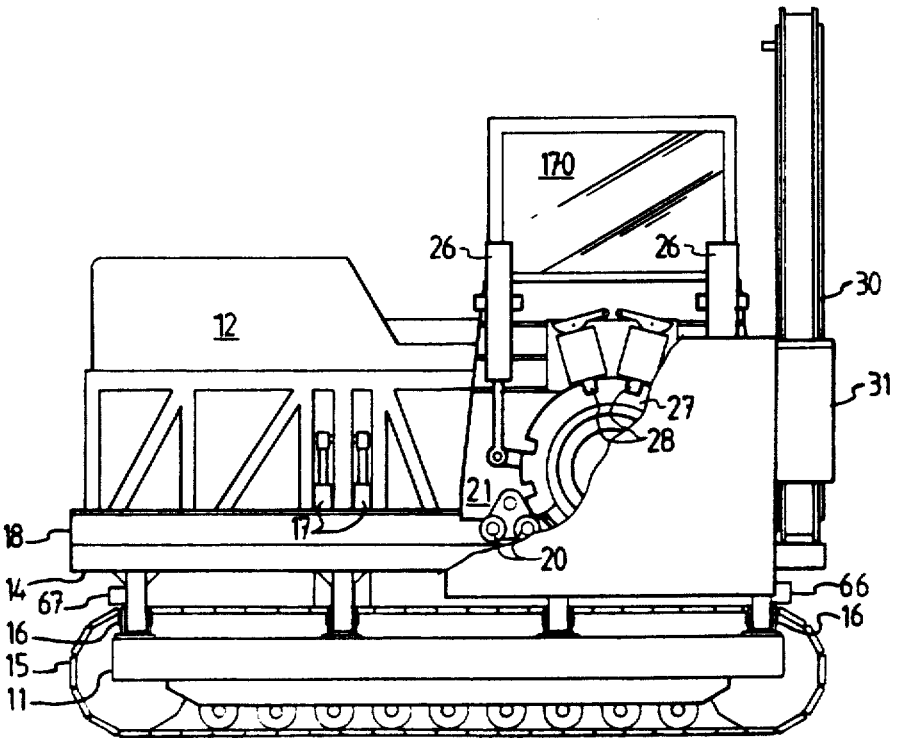
FIG. 4 is a part-sectional view taken along the line 4—4 of FIG. 3.

Hydraulic rams 26 connected between the carriage 21 and the mounting sleeve assembly 24 may be actuated for pivoting the latter so that the trenching arm assembly may be pivoted between its substantially vertical operative trenching position, as illustrated, and a horizontal position at which it lies alongside the carrier assembly for transport purposes. As can be seen in FIG. 4, the pivot tube 23 is provided with a notched collar 27 in which pawls 28 may engage to hold the trenching arm 25 in either its operative trenching position or its raised travelling position.

A dirt conveyor 30 is supported on the carriage 21. The conveyor 30 extends from a lower position, adjacent an outlet chute 31 provided on the mounting sleeve assembly 24 and through which dirt may spill from the trenching chain 35, upwardly across the power pack for discharging dirt to one side of the excavated trench.

Figure 5:
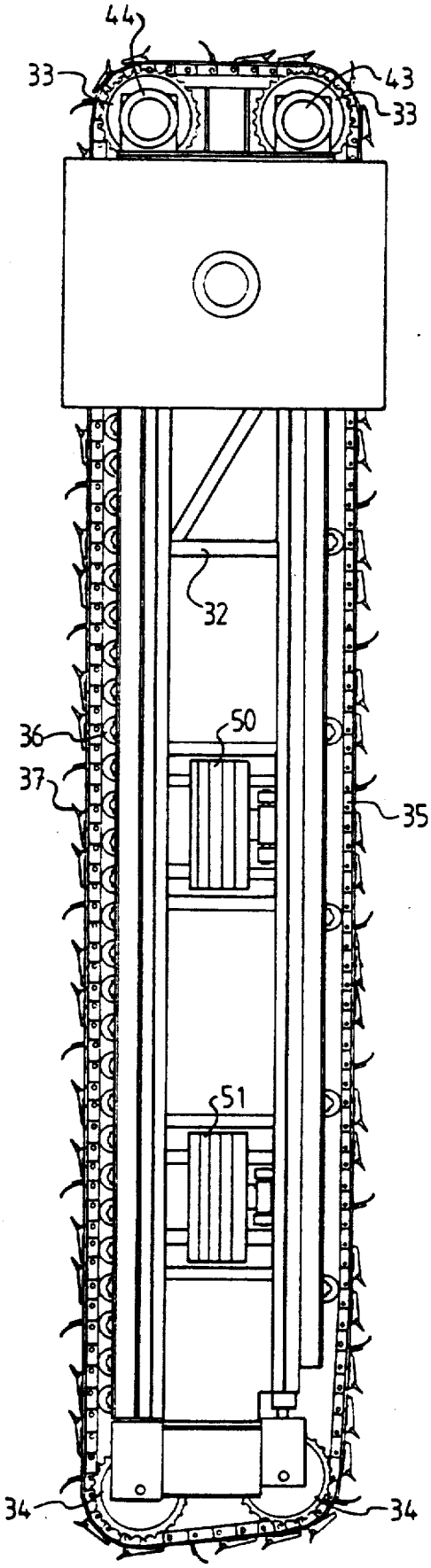
FIG. 5 is a broken away side view of the trenching arm.
Figure 8:
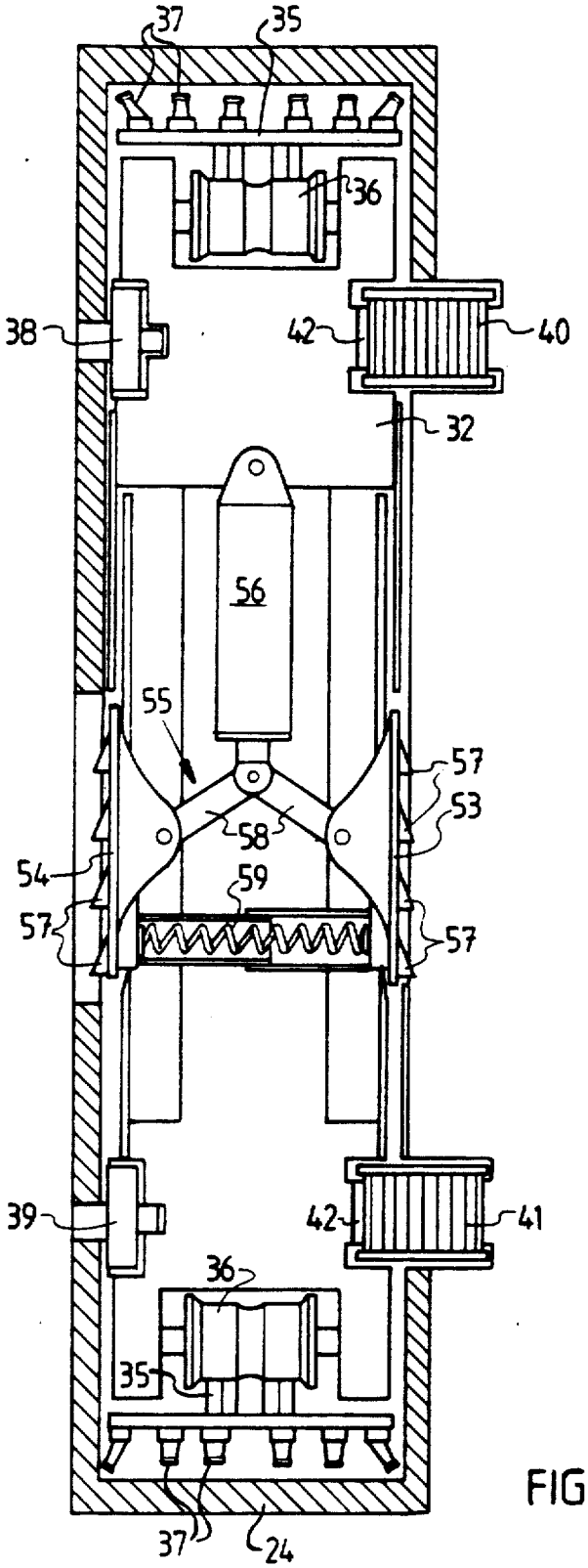
FIG. 8 is a transverse section through a trenching arm illustrating one form of the advancing mechanism.

Referring to FIGS. 5 and 8 it will be seen that the trenching arm 25 includes a trenching arm frame 32 which supports upper and lower pairs of sprockets 33 and 34 respectively, about which the segmented trenching chain 35 extends. Intermediate rollers 36 are provided for supporting the chain between the pairs of sprockets 33 and 34 and cutting teeth 37 are mounted in staggered relationship on regularly spaced segments of the chain 35. The lower sprockets 34 are arranged so that bottom run of the trenching chain extends upwardly and rearwardly from the front lower sprocket to the rear lower sprocket. The upper sprockets 33 are driven by independent hydraulic motors 43 and 44. The trenching arm frame 32 is provided with a spaced pair of guide rollers 38 and 39 which engage tracks 47 on the outermost face of the trenching arm frame and driven gears 40 and 41 which engage racks 42 on the inner face of the trenching arm frame 32 whereby the latter may be moved through the mounting sleeve assembly 24 so as to adjust the depth of excavation.

The carriage 21 is connected to the carrier assembly 14 by a chain drive assembly 45 having a chain 48 which extends from the carriage about a leading sprocket driven by the motor 46 mounted on the carrier assembly 14 adjacent the front of the machine and an idler sprocket 49 mounted on the carrier assembly adjacent the rear. The hydraulic motor 46 is adapted to be actuated to advance the carriage 21 along the rails 18 and 19 so as to advance the trenching arm for excavation purposes.

The trenching arm assembly 25 is also provided with advancing mechanisms 50 and 51 at spaced positions intermediate its length which may be engaged with the side walls of an excavated trench so as to push the lower portion of the trenching arm 25 forwardly into cutting arrangement with the face of the excavation. As shown in FIG. 8, each advancing mechanism 50 and 51 includes a pair of side plates 53 and 54 supported by a linkage 55 actuated by a hydraulic ram 56 whereby the side plates 53 and 54 may be forced outwardly into engagement with the side of the trench.

The side plates are provided with barbs 57 to facilitate positive engagement with the side walls of the trench and the arrangement of the interconnected trailing links 58 is such that initial extension of the hydraulic ram forces the side plates apart until they engage the side walls of the trench whereafter further extension of the ram 56 will cause relative longitudinal movement between the side plates 53 and 54 and the trenching arm frame 32 so as to push the trenching arm into cutting relationship with the advancing face of the excavation. The side plates 53 and 54 are interconnected by a spring 59 such that a preload is applied between the side plates 53 and 54 and the side walls of the trench. Retraction of the ram 56 will draw the side plates 53 and 54 away from the side walls of the trench and move them to their forward position.

Figure 9:
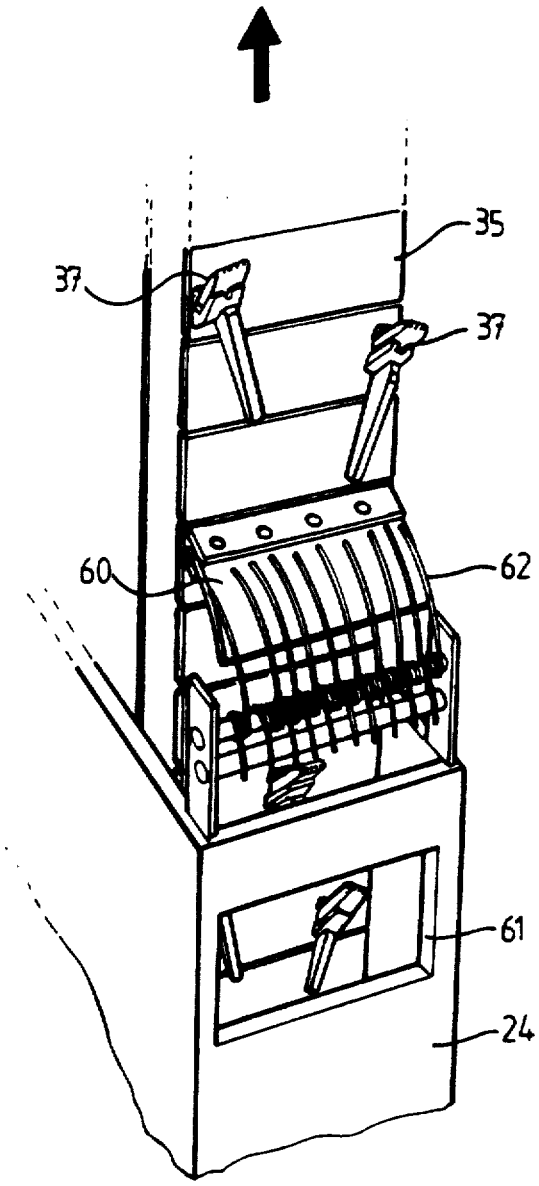
FIG. 9 illustrates one form of dirt conveying flap for the trenching chain and the associated cleaning apparatus.

As shown in FIG. 9 the front end wall of the mounting sleeve assembly 24 is apertured at 61 to permit excavated dirt to pass thereto into the chute 31 for discharge at the opposite side of the trenching apparatus along the conveyor assembly 30.

Dirt removed from the advancing face of the trench falls into the gap between the trench walls and the trenching chain 35. It falls onto dirt conveying flaps 60 which are attached to the trenching chain at intervals. The upward movement of the front run of the trenching chain 35 raises these dirt conveying flaps 60 and the dirt upon them out of the excavation. Formed guides in and below the mounting sleeve assembly 24 act as a continuation of the trench to contain the dirt resting on the dirt conveying flaps 60 until it reaches a discharge port 61 in the mounting sleeve 24 above the discharge conveyor 30 from whence it falls onto the discharge conveyor 30 through the chute 31. Dirt which remains on the dirt conveying flaps or the trenching chain is removed by rows of cleaning springs 62 attached to the mounting sleeve 24. These cleaning springs 62 are adapted to scrape along the trenching chain 35 in their normal operating position and to spring away from the trenching chain 35 when contact is made with a digging tooth 37 or a dirt conveying flap 60.

The transverse inclination of the trenching arm is monitored by means of an electronic level sensor 63 mounted in the trenching arm frame 32. The output from this sensor is fed to a control computer 64, which compares the measured inclination with the desired inclination and if necessary actuates the platform tilt cylinders 17 to being the trenching arm back to the desired inclination. A similar system is employed to control the inclination of the trenching arm about the axis of the pivot tube 23. The output of the computer controls the relative speed of the carriage drive and the trencher arm advancing mechanism to maintain the trenching arm at the desired inclination. The alignment of the trenching apparatus with respect to the desired line of the trench is monitored by setting up a laser beam transmitter 65 on a line parallel to the excavation line of the trench and monitoring the points of intersection of the beam and two laser beam detectors 66 and 67 mounted near the front and rear of the machine. The drive motors 68 for the crawler tracks 13 and 15 are also controlled by the computer 64 to correct any errors that are detected by the system. This may be achieved after the carriage 21 has travelled the full length of the carrier and before the commencement of excavation of the next section of trench. Accordingly, the trenching apparatus 10 may excavate a zigzag path which approximates a straight line. Alternatively, the drive motors 68 may be operated as required during the excavation process to produce frequent small corrections to the direction of the excavation.

Figure 6:
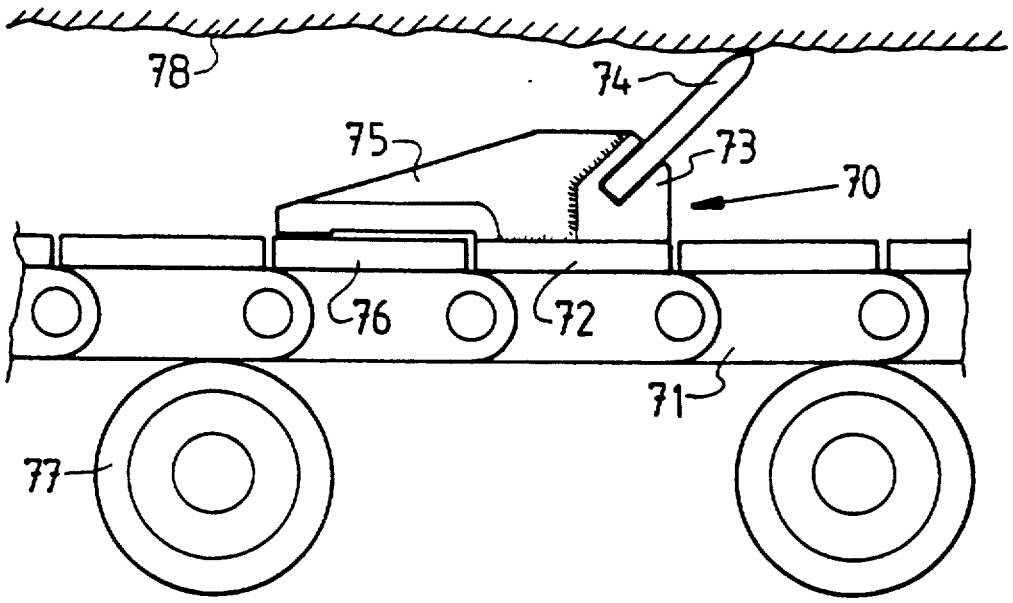
FIG. 6 is a side view of portion of the trenching chain showing the arrangement of the cutting teeth.
Figure 7:
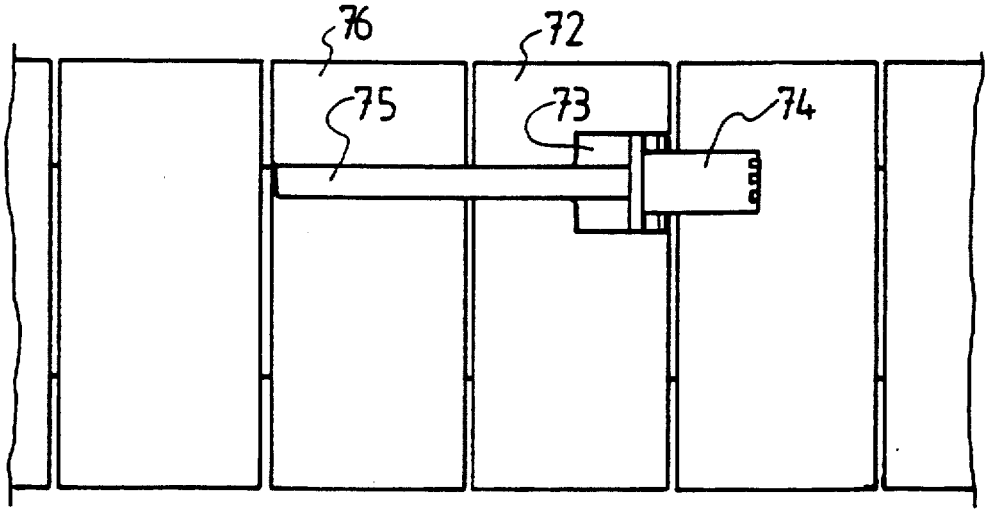
FIG. 7 is a plan view corresponding to FIG. 6.

As shown in FIGS. 6 and 7, the trenching chain assembly 70 consists of an endless chain 71 to which a plate 72 is attached. The plate 72 carries a toolholder 73 in which a detachable cutting tool 74 is mounted. A bracing bar 75 is rigidly attached to the plate 72 carrying the toolholder 73 and extends in a direction along the endless chain 71 rearward from the cutting tool to contact a trailing plate 76 which is attached to the endless chain 71 behind the plate 72 when the chain is flat. The shape of the bracing bar 75 is such that it passes around the chain guide sprockets at a smaller radius than the tip of the cutting tool 74, so that it does not contact the trench face. The side of the bracing bar 75 facing the trailing plate 76 is relieved to ensure that contact between the bracing bar 75 and the trailing plate 76 occurs towards the rear of the trailing plate 76. The side of the bracing bar 75 facing the trailing plate 76 is also chamfered to reduce the possibility of excavated material lodging between the bracing bar 75 and the trailing plate 76. Idler wheels 77 run against the back of the chain 71 to force the cutting tool 74 against the face of the excavation 78.

Figure 10:
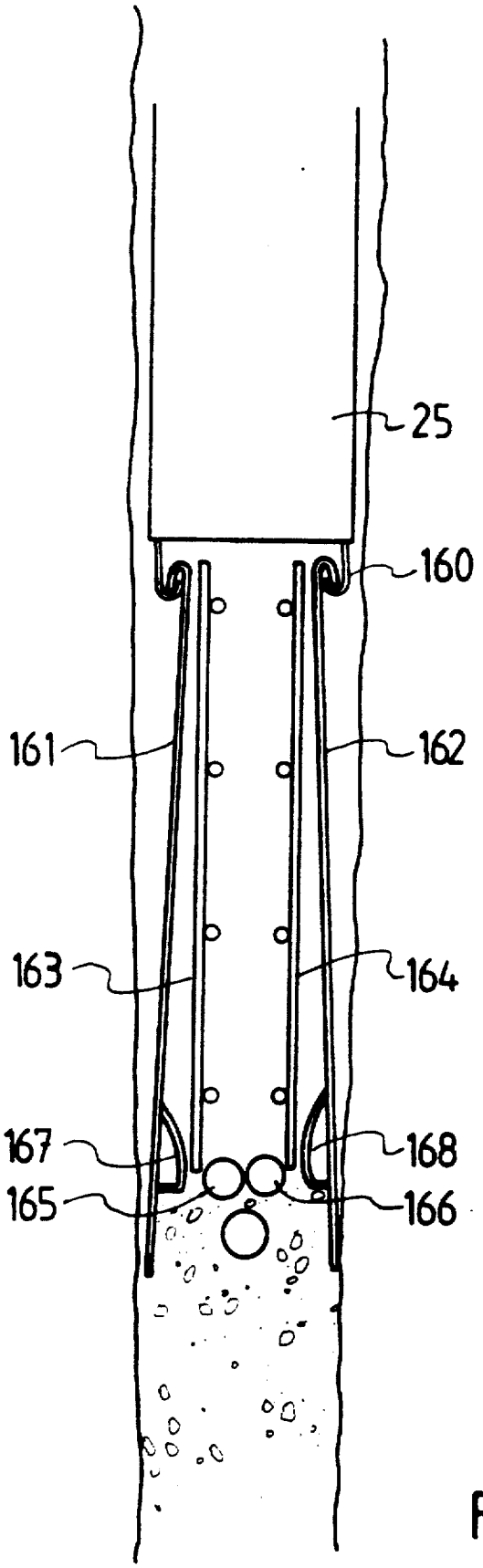
FIG. 10 is a diagrammatic plan view illustrating one method of introducing concrete and reinforcing into the trench.

FIG. 10 illustrates one method of introducing reinforcing and concrete into the trench rearwardly of the trenching arm 25. For this purpose the latter is provided with trailing connectors 160 for connecting shields 161 and 162 thereto, whereby the shields engage opposite walls of the trench and provide a clear space therebetween into which reinforcements 163 and 164 may be dropped. The reinforcements are fed through the gaps between rollers 165 and 166 and guides 167 and 168 on the trailing ends of the shields. As reinforcement is fed into the trench between the rollers and guides, new sections may be dropped into place between the shields. A concrete discharge chute 169 fed by a suitable concrete pump is used to continuously discharge concrete into the trench about the reinforcements. The rollers 165 and 166 and the guides 167 and 168 define a small gap therebetween through which little concrete seeps so that the space into which reinforcements are fed is kept largely clear.

In use, the trenching apparatus is driven to the site and the trenching arm 25 is aligned with the excavation line. It is then actuated and moved vertically into engagement with the earth to be excavated until it has reached the required depth which may be up to eight meters. The carriage 21 is initially arranged in its rearmost position on the rails 18 and the trenching apparatus 10 is positioned so that movement of the carriage 21 along the rails 18 and 19 will carry the trenching arm 25 along the excavation line. A portion of the trench is excavated by forcing the carriage 21 along the rails to its forward most position and by simultaneously actuating the advancing means 50 and 51 provided in the frames of the trenching arm 25. The crawler tracks 13 and 15 are then actuated and the crawler base assembly is moved forward alongside the excavation line so that the carriage is again positioned at the trailing ends of the rails 18 and 19. This process is continued until the desired trench has been formed. Of course at each move of the supporting base, the latter may be aligned to correct runoffs of the portion of the trench just excavated. Furthermore, the hydraulic rams 17 may be actuated to vary the tilt of the excavation arm relative to the supporting base so that the excavation arm can be maintained vertical or at a selected inclined position. Automatic control apparatus may be provided to maintain the desired control over the trenching arm and suitably an operator's cab 170 is supported above the carriage 21 so that an operator can maintain a close visual inspection of the trench being excavated.

Figure 11:
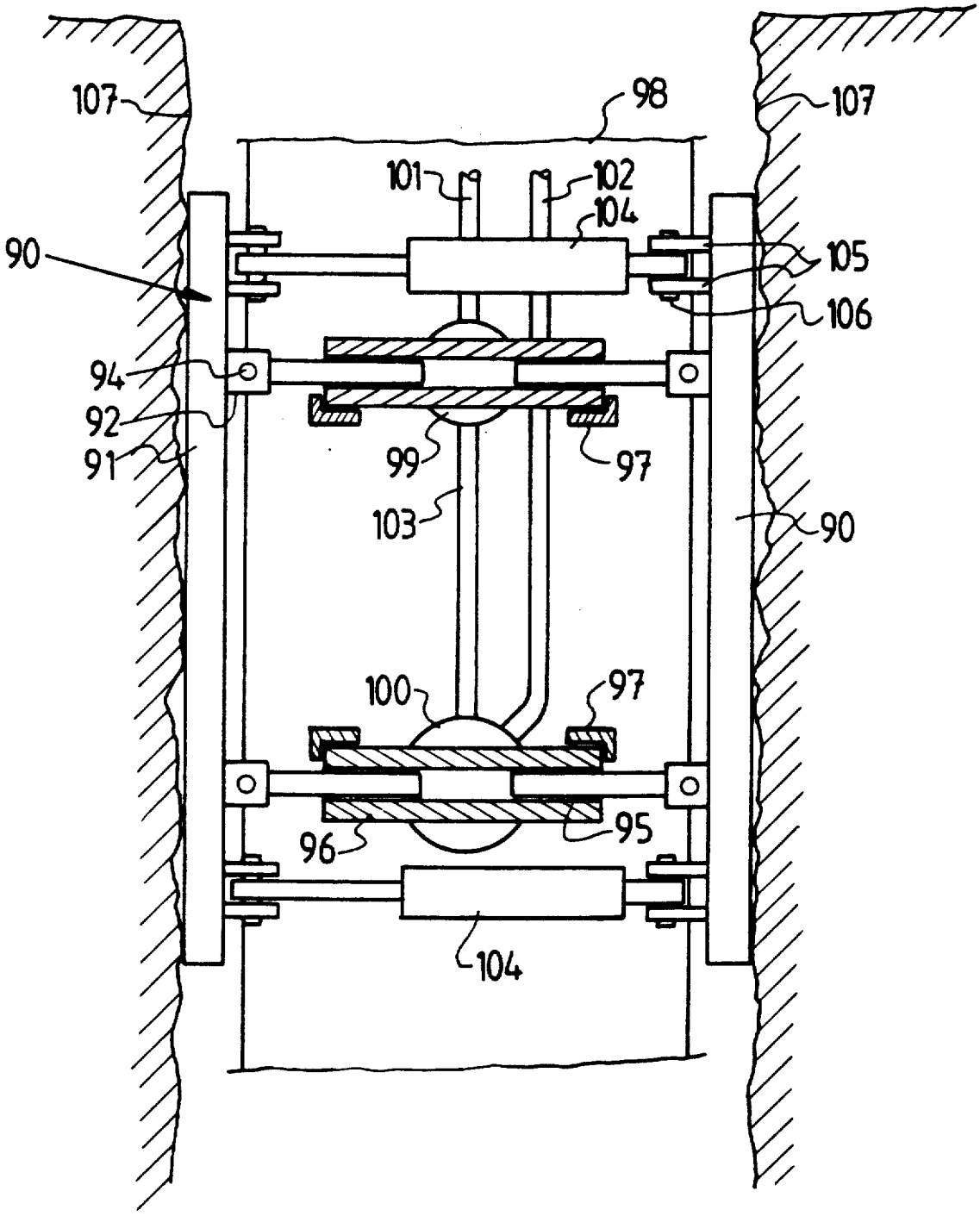
FIGS. 11 and 12 illustrate a further form of advancing mechanism.
Figure 12:
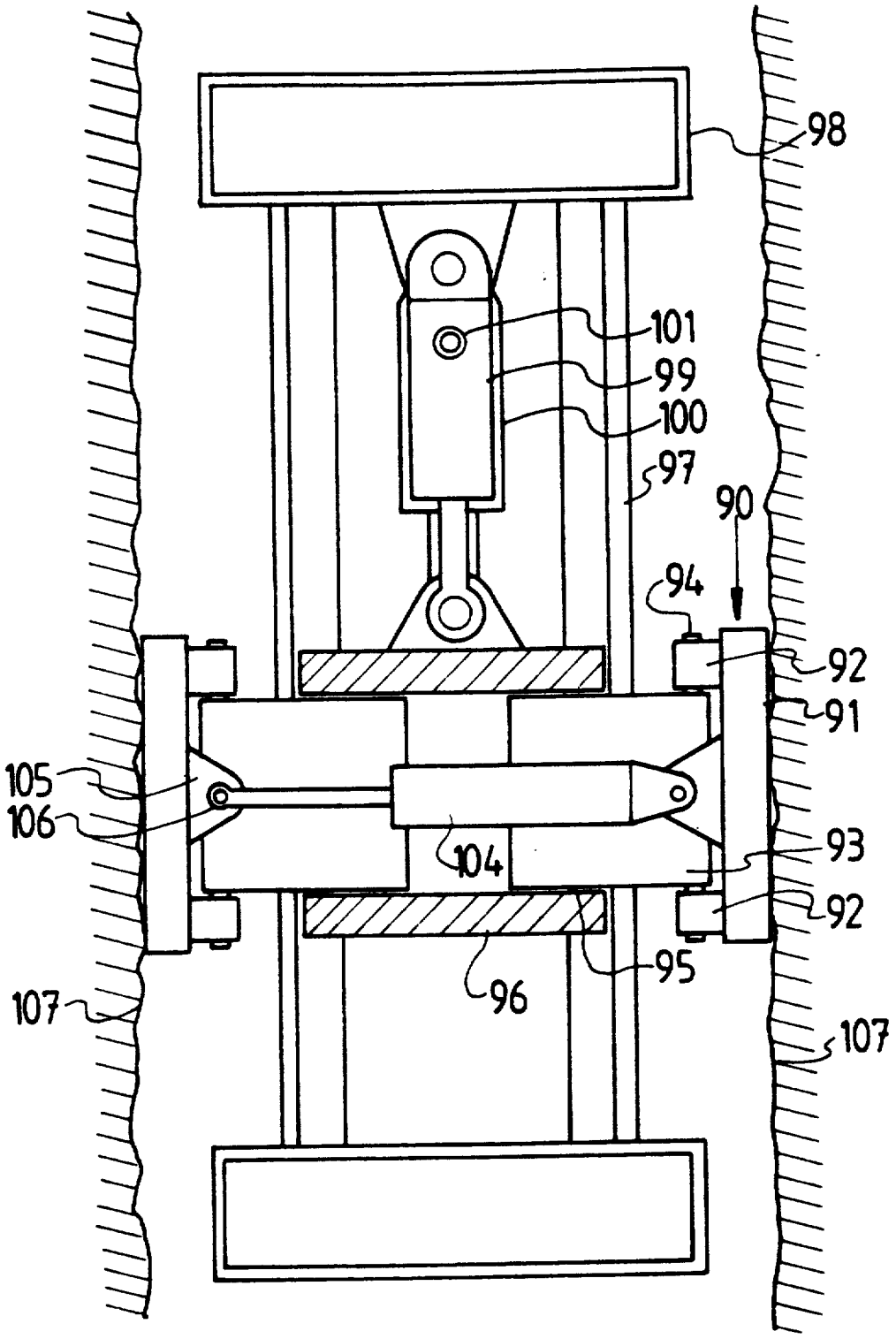

When the apparatus is excavating, the chain 71 is driven parallel to the face 78 to be cut, and forced into the face 78 by the idler wheels 77. This imposes forces on the cutting tool 74 which produce a moment tending to rotate the tool holder 73 backwards by flexing the chain 71. This moment is resisted and the rotation of the chain link is limited by contact between the bracing bar 75 and the trailing plate 76. As shown in FIGS. 11 and 12, the reciprocating plate advance assembly 90 comprises plates 91 attached to pivot blocks 92 which are pivotally attached to slide blocks 93 by pivot pins 94. The slide blocks 93 are free to slide transversely in the slots 95 in the traverse blocks 96. The traverse blocks 96 are free to slide longitudinally in guides 97 attached to the trenching arm frame 98. The traverse blocks 96 are connected to the trenching arm frame 98 through the upper fluid actuator 99 and the lower fluid actuator 100. One pipe 101 of the fluid supply system is connected to the full piston area side of the upper fluid actuator 99 and the second pipe 102 is connected to the rod side of the lower fluid actuator 100. The rod side of the upper fluid actuator 99 and the full piston area side of the lower fluid actuator 100 are interconnected by a pipe 103. The relative sizes of the upper fluid actuator 99 and the lower fluid actuator 100 are such that the fluid displaced from the rod side of the upper fluid actuator 99 by a certain extension of the upper fluid actuator 99 causes an equal extension in the lower fluid actuator 100 when applied to the full piston area side of the lower fluid actuator 100. The pusher plates 91 are extended and retracted laterally by fluid actuators 104 which are attached to the pusher plates 91 through brackets 105 and clevis pins 106.

Figure 13:
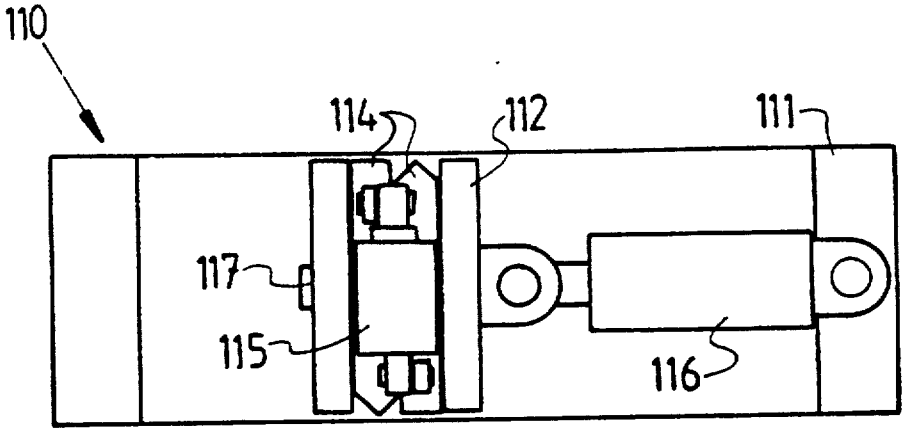
FIGS. 13 and 14 illustrate yet another form of advancing mechanism.
Figure 14:
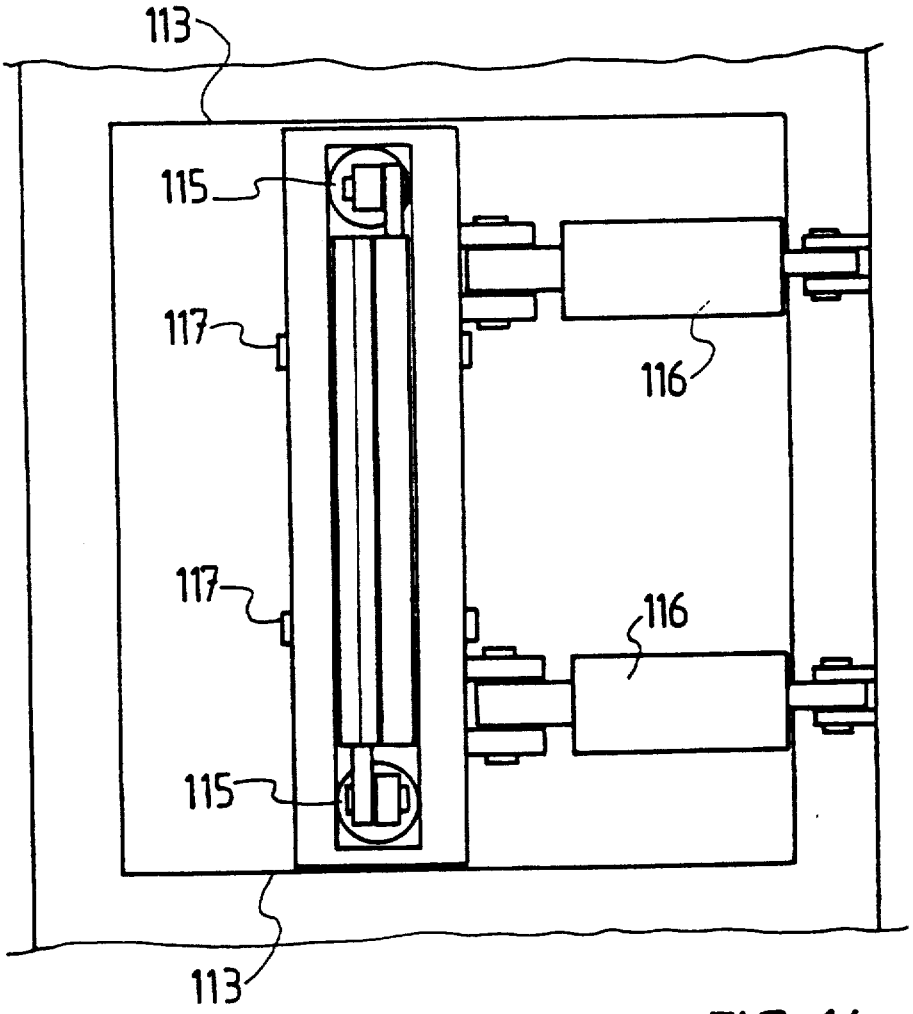

Soft-soil advance system 110, which is shown in FIGS. 13 and 14, caries within a frame 111, fixed within the trenching arm, a carriage 112 slidable longitudinally within the frame 111 on slides 113. Plates 114 are slidable laterally within the carriage 112 and constrained to move longitudinally with the carriage 112. The plates 114 are attached to lateral actuators 115 to extend and retract them. The carriage 112 is attached by longitudinal actuators 116 to the frame 111. The plates 114 are restrained from excessive lateral travel by limit pins 117 fixed in the carriage 112 and engaging with slots in the plates 114.

Figure 15:
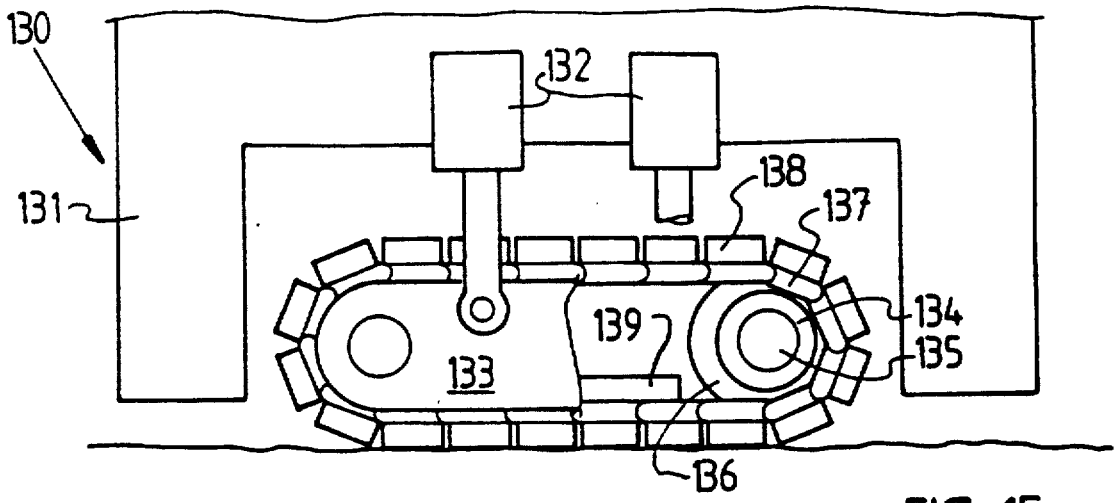
FIGS. 15 and 16 illustrate a further form of advancing mechanism.
Figure 16:
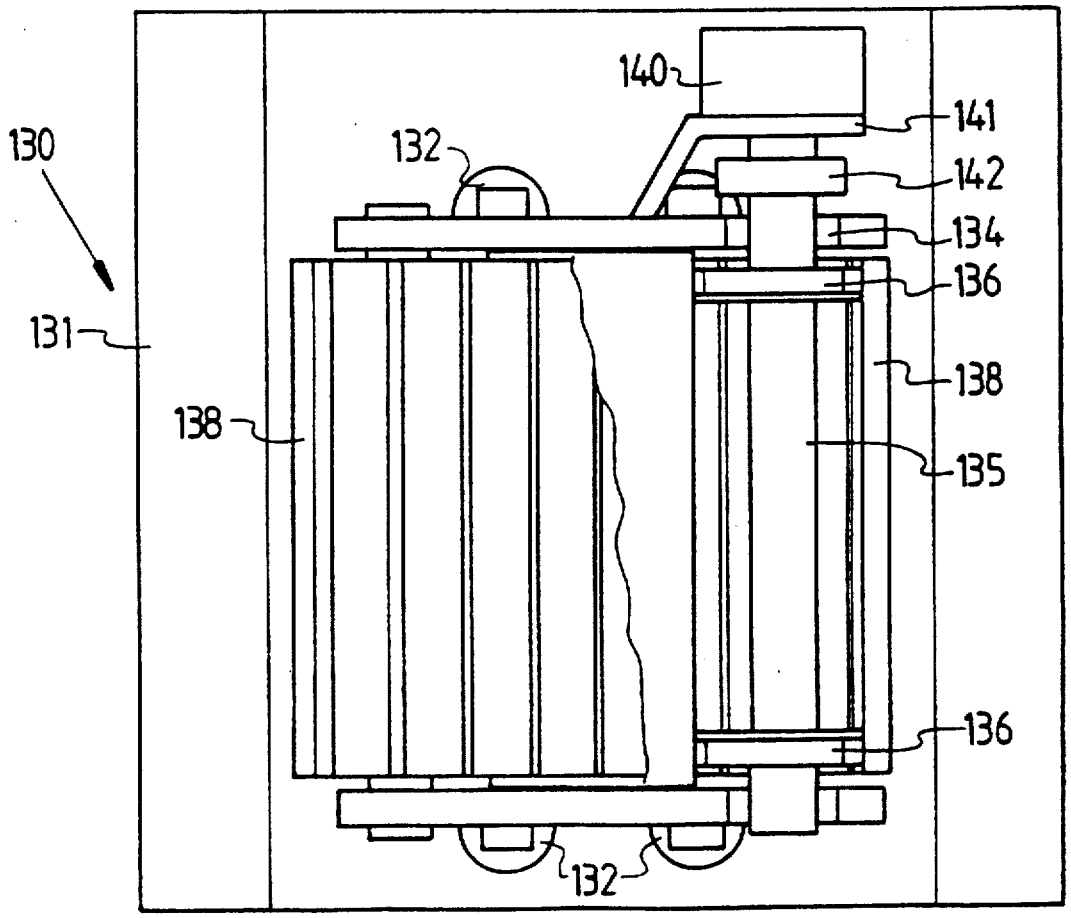

The endless-chain advance system 130 illustrated in FIGS. 15 and 16 comprises a frame 131 fixed within the trenching arm, with lateral actuators 132 connected between the frame 131 and the carriers 133. The carriers 133 support bearings 134 in which shafts 135 may rotate. The shafts 135 carry sprockets 136 which engage with endless chains 137. Slats 138 are attached to the endless chains 137. Pressure plate 139 is attached to carriers 133 and disposed on the inner side of the outer run of the endless chains 137. Drive is provided by one or more rotary actuators 140 mounted to the carriers 133 by brackets 141 and coupled to the shafts 135 by couplings 142.

To advance a trenching arm to which it is fitted, the reciprocating plate advance system is utilised by energising the lateral actuators 104 to retract the plates 91 away from the sides of the excavation 107 while the longitudinal actuators 99 and 100 draw the carriage 96 together with the slides 93 and the plates 91 forward relative to the frame 97. The lateral actuators 104 are then extended to bring the plates 91 into contact with the walls of the excavation 107 and the longitudinal actuators 99 and 100 are employed to force the trenching arm forward relative to the plates 91 which remain stationary in the excavation. The series arrangement of the longitudinal actuators 99 and 100 and their relative piston areas ensure that the extension of both cylinders is the same so that the carriage 96 will not tilt and bind in the slides 97.

In order to advance a trenching arm in which it is installed, the soft-soil advance system is utilised by employing the longitudinal actuators 116 to pull the carriage 112 forward in the frame 111 with the lateral actuators 115 retracted to withdraw the plates 114 within the profile of the frame 111. The lateral actuators 115 are then extended to force the plates 114 into the side of the excavation 118. When the plates 114 have penetrated a sufficient distance into the side of the excavation 118 to provide resistance to longitudinal movement of the plates 114 relative to the side of the excavation 118, the longitudinal actuators 116 are energised to force the frame 111, and thus the trenching arm, forward in the excavation. When the longitudinal actuators 116 are extended, the lateral actuators 115 are retracted to withdraw the plates 114 from the side of the excavation 118 and the cycle is repeated.

To advance a trenching arm in which it is installed, the endless chain advance system is extended from the trenching arm frame 131 by the lateral actuators 132 until the outer run of slats 138 is forced against the side of the excavation 143 by the pressure plate 139. The rotary actuator 140 is then energised to rotate the sprockets 136 and move the outer run of the chains 137 and slats 138 backwards with respect to the frame 131, propelling the trenching arm forwards.

It will of course be realised that while the above has been given by way of illustrative example of this invention, all such and other modifications and variations thereto as would be apparent to persons skilled in the art are deemed to fall within the broad scope and ambit of this invention as is defined in the appended claims.

What I claim is:

1. Trenching apparatus comprising:

a supporting base supported for longitudinal movement along an excavation line;

a carriage;

mounting means for mounting said carriage on said supporting base, said carriage being restrained by said mounting means for longitudinal movement along said supporting base; and a trenching arm assembly supported by said carriage and operable to excavate a section of trench along said excavation line as said carriage moves longitudinally along said supporting base, said trenching arm assembly including a trenching arm frame, said trenching arm frame supporting opposed trench-engaging members which may be forced outwardly into engagement with the opposed side walls of a trench, and advancing means associated with said members for advancing said trenching arm frame.

2. Trenching apparatus according to claim 1, wherein a shield means is connected to said trenching arm assembly for containing soil pressures in the walls of the trench being excavated, said shield means providing a clear space within the trench into which reinforcement may be fed and being provided with a concrete discharge means associated with said shield means for discharging concrete into the trench behind said shield means.

3. Trenching apparatus according to claim 1, wherein said trenching arm assembly is pivotable about a longitudinal axis to be able to be tilted relative to said supporting base.

4. Trenching apparatus according to claim 3, wherein said mounting means includes a platform having longitudinally extending guide rails along which said carriage may move and being provided with drive means for moving said carriage along said guide rails.

5. Trenching apparatus according to claim 4, wherein said carriage is provided with supporting wheels captively engaged with said rails.

6. Trenching apparatus according to claim 4, wherein said platform is pivotally connected to said supporting base for pivotal movement about a longitudinal tilt axis and being provided tilting means for controlling the pivotal movement of said platform about said tilt axis.

7. Trenching apparatus according to claim 4, wherein a digging chain is guided about said trenching arm frame and a chain drive means drives said digging.

8. Trenching apparatus according to claim 7, wherein said trenching arm frame is adjustably mounted on a carrier supported by said carriage wherein a depth of excavation may be varied and being provided with a depth adjustment control means for selectively positioning said trenching arm frame relative to said carrier.

9. Trenching apparatus according to claim 8, wherein said trenching arm assembly is pivotally connected to said carriage for movement between a lowered trenching attitude and a raised travelling attitude.

10. Trenching apparatus according to claim 8, wherein said carrier is connected to said carriage for pivotal movement about a transverse pivot axis.

11. Trenching apparatus according to claim 7, wherein said trenching arm frame supports trenching arm advancing means remote from said carrier which is engageable with the side walls of a trench and operable to advance the trenching arm assembly.

*12. A trenching apparatus, comprising:*

*a trenching arm assembly having an upper end and a lower end;*

*an above ground propulsion unit connected to said upper end of said trenching arm assembly for advancing said upper end of said trenching arm assembly along an excavation line;*

*digger means associated with said trenching arm assembly for initially digging said trenching arm assembly substantially vertically downwardly from ground level to a position wherein said lower end of said trenching arm assembly is located below ground; and*

*a below ground propulsion unit carried by said lower end of said trenching arm assembly for advancing said lower end of said trenching arm assembly, as said above ground propulsion unit advances said upper end thereof, along said excavation line.*

*13. A trenching method, comprising:*

*digging substantially vertically downwardly from ground level to a desired trench depth using a trenching arm assembly so that a below ground propulsion unit mounted to a lower end of said trenching arm assembly is located below ground level;*

*excavating a trench by propelling an upper end of said trenching arm assembly along an excavation line with an above ground propulsion unit, and by propelling said lower end of said trenching arm assembly along said excavation line with said below ground propulsion unit.*

*14. A trenching method, comprising:*

*digging substantially vertically downwardly from ground level to a desired trench depth using a digger mechanism associated with a trenching arm assembly so that a lower end of said trenching arm assembly is located below ground;*

*excavating a trench by propelling an upper end of said trenching arm assembly along a desired trench line with an above ground propulsion unit, and by propelling said lower end of said trenching arm assembly along said desired trench line with a below ground propulsion unit which is separate from said digger mechanism.*

* * * * *